United States Patent
Moon et al.

(10) Patent No.: US 8,422,113 B2
(45) Date of Patent: Apr. 16, 2013

(54) PANEL INCLUDING THERMOCHROMIC LAYER

(75) Inventors: Dong-Gun Moon, Suwon-si (KR); Myun-Gi Shim, Suwon-si (KR); Soo-Ho Park, Suwon-si (KR); Mi-Hyun Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 237 days.

(21) Appl. No.: 12/634,630

(22) Filed: Dec. 9, 2009

(65) Prior Publication Data

US 2011/0080631 A1 Apr. 7, 2011

Related U.S. Application Data

(60) Provisional application No. 61/247,776, filed on Oct. 1, 2009.

(51) Int. Cl.
*G02F 1/01* (2006.01)

(52) U.S. Cl.
USPC .......................................................... 359/288

(58) Field of Classification Search .................. 359/288, 359/265–275, 359; 428/96, 432, 457, 34; 345/106; 252/582, 583; 250/505.1, 517.1
See application file for complete search history.

(56) References Cited

U.S. PATENT DOCUMENTS

| | | | |
|---|---|---|---|
| 6,399,228 B1 * | 6/2002 | Simpson ....................... | 428/699 |
| 6,440,592 B1 | 8/2002 | Meyer et al. | |
| 6,673,427 B2 | 1/2004 | Guiselin et al. | |
| 7,311,976 B2 | 12/2007 | Arnaud et al. | |
| 2002/0037421 A1 | 3/2002 | Arnaud et al. | |
| 2003/0054177 A1 | 3/2003 | Jin | |
| 2004/0005472 A1 | 1/2004 | Arnaud et al. | |
| 2004/0155154 A1 * | 8/2004 | Topping ..................... | 244/158 R |
| 2005/0270960 A1 * | 12/2005 | Meinders ................... | 369/272.1 |

FOREIGN PATENT DOCUMENTS

| | | |
|---|---|---|
| JP | 2002-086606 | 3/2002 |
| JP | 2003-094551 | 4/2003 |
| JP | 2008-297177 | 12/2008 |
| JP | 2008-297500 | 12/2008 |
| KR | 10-0143716 | 4/1998 |

OTHER PUBLICATIONS

Parkin et al.; Intelligent Thermochromic Windows; Journal of Chemical Education, Mar. 2006; vol. 83, No. 3 (pp. 393-400).
KIPO Office action dated Nov. 25, 2011, for corresponding Korean Patent application 10-2010-0056744, 4 pages.
European Search Report dated Mar. 1, 2011, for corresponding European Patent application 10251644.0, noting listed references in this IDS, as well as U.S. Patent 6,440,592, previously filed in an IDS dated Dec. 9, 2009.

\* cited by examiner

*Primary Examiner* — Tuyen Tra
(74) *Attorney, Agent, or Firm* — Christie, Parker & Hale, LLP

(57) ABSTRACT

A panel including a thermochromic layer. A panel includes a transparent substrate, a plurality of thermochromic layers on the transparent substrate, and a plurality of dielectric layers stacked with the thermochromic layers. The thermochromic layers may include vanadium oxide, in which a chemical stoichiometric ratio of vanadium to oxygen may be about 1:2 or about 2:5.

23 Claims, 4 Drawing Sheets

PANEL INCLUDING THERMOCHROMIC LAYER

CROSS-REFERENCE TO RELATED APPLICATION

This application claims priority to and the benefit of U.S. Provisional Patent Application No. 61/247,776 filed Oct. 1, 2009, the entire content of which is incorporated by reference herein.

BACKGROUND

1. Field

One or more embodiments of the present invention relate to a glass including a thermochromic layer.

2. Description of the Related Art

With the rapid increase of the cost of chemical energy sources such as petroleum, demand for development of a new energy source is increasing. However, it is also important to control energy consumption. In a typical household, 60% or more of energy is consumed in heating and cooling. In particular, about 24% of the consumed energy escapes through windows of typical houses and buildings.

Various attempts have been made to reduce the amount of energy that escapes through windows. For example, the size of windows may be controlled, or high insulation window panes may be installed.

Examples of high insulation window panes include an argon (Ar) gas-injected double-layer glass which is formed by injecting Ar gas between two panes of glass to prevent heat exchange, a Low-E glass, etc. Also, a glass coated with a thermal layer for controlling energy inflow via solar radiation is being developed.

SUMMARY

One or more embodiments of the present invention are directed to a panel (e.g., a glass panel) including a thermochromic layer for controlling infrared ray transmittance.

According to one embodiment, a panel includes a transparent substrate, a plurality of thermochromic layers on the transparent substrate, and a plurality of dielectric layers stacked with the thermochromic layers.

The thermochromic layers may include vanadium oxide, in which a chemical stoichiometric ratio of vanadium to oxygen may be about 1:2 or about 2:5.

At least one of the thermochromic layers may further include a halogen. The halogen may include fluorine (F).

At least one of the thermochromic layers may further include a metal additive. The metal additive may be selected from the group consisting of titanium (Ti), niobium (Nb), molybdenum (Mo), iridium (Ir), tungsten (W), and combinations thereof. The metal additive may be a dopant.

A first one of the thermochromic layers may include a first amount of metal additive that is different from a second amount of metal additive included in a second one of the thermochromic layers.

A first one of the thermochromic layers may include a first type of metal additive that is different from a second type of metal additive included in a second one of the thermochromic layers.

The transparent substrate may include a material selected from the group consisting of glass, indium tin oxide (ITO), polymer film, and combinations thereof.

At least one of the plurality of dielectric layers may include a material selected from the group consisting of tantalum oxide ($Ta_2O_5$), zinc oxide (ZnO), tin oxide ($SnO_2$), niobium oxide ($Nb_2O_5$), titanium oxide (TiO), titanium dioxide ($TiO_2$), silicon oxynitride (SiON), silicon oxy carbide (SIOC), silicon dioxide ($SiO_2$), and combinations thereof.

A first one of the plurality of dielectric layers may include a material different from that of a second one of the plurality of dielectric layers.

Each of the thermochromic layers may have a thickness between about 20 nm and about 500 nm.

According to another embodiment, a panel includes a transparent substrate; a first dielectric layer on the transparent substrate; a first vanadium oxide layer on the first dielectric layer; a second dielectric layer on the first vanadium oxide layer; a second vanadium oxide layer on the second dielectric layer; and a third dielectric layer on the second vanadium oxide layer. The panel may also include another transparent substrate on the third dielectric layer.

A chemical stoichiometric ratio of vanadium to oxygen in each of the first and second vanadium oxide layers may be about 1:2 or about 2:5.

The first vanadium oxide layer and the second vanadium oxide layer may have different transition temperatures.

The first vanadium oxide layer may include a first amount of metal additive that is different from a second amount of metal additive included in the second vanadium oxide layer.

The first vanadium oxide layer may include a first type of metal additive that is different from a second type of metal additive included in the second vanadium oxide layer.

The first vanadium oxide layer may contain about 1.8 at. % to about 2.5 at. % of W, and the second vanadium oxide layer may contain about 1 at. % to about 1.5 at. % of W.

Each of the first and second vanadium oxide layers may have a thickness between about 20 nm and about 500 nm.

At least one of the first, second and third dielectric layers may include $TiO_2$.

Figure 1A:
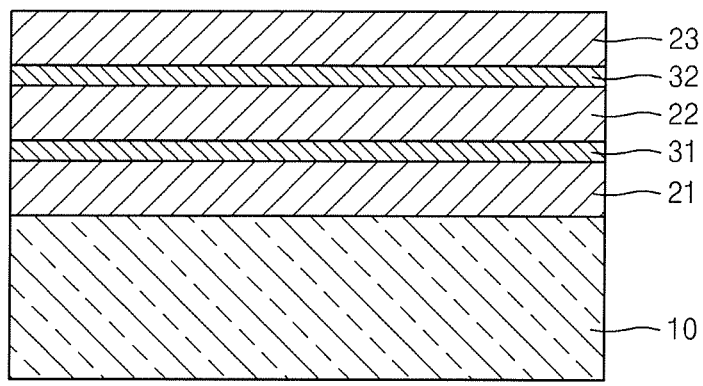
FIGS. 1A and 1B are cross-sectional views illustrating a panel including a thermochromic layer, according to an embodiment of the present invention.

EXPLANATION OF REFERENCE NUMERALS DESIGNATING SOME OF THE ELEMENTS OF THE DRAWINGS

10: transparent substrate
21: first dielectric layer
31: first thermochromic layer
22: second dielectric layer 32: second thermochromic layer
23: third dielectric layer

DETAILED DESCRIPTION

A panel including a thermochromic layer according to embodiments of the present invention will now be described more fully with reference to the accompanying drawings, in which exemplary embodiments of the invention are shown.

Figure 1B:
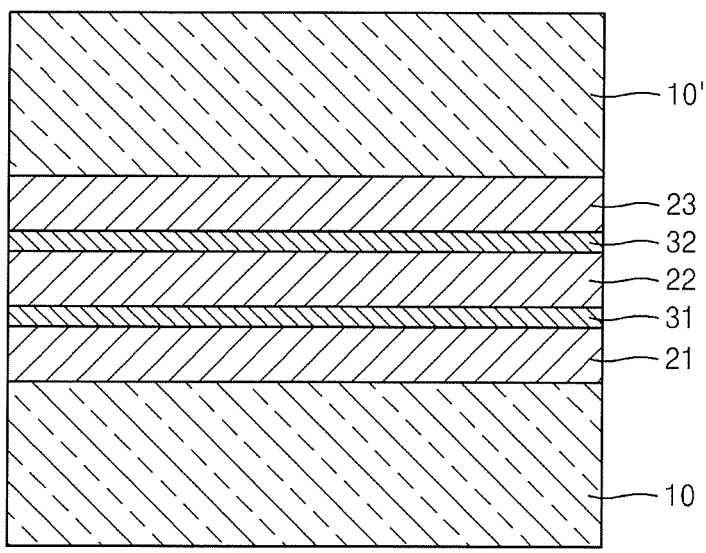

FIGS. 1A and 1B are cross-sectional views illustrating a panel including a thermochromic layer, according to an embodiment of the present invention.

Referring to FIGS. 1A and 1B, the panel includes a transparent substrate (e.g., a glass substrate) 10, a plurality of dielectric layers 21, 22, 23, and a plurality of thermochromic layers 31, 32.

In one embodiment, the transparent substrate 10 is a flat substrate that is used as a window pane, and may be formed of any glass or any other suitable flat transparent substrate. The material, thickness, size, or shape of the transparent substrate 10 may be selected according to purposes or desired characteristics. Alternatively to or in addition to glass, the transparent substrate 10 may include any other suitable transparent material such that the transparent substrate 10 can be used as a window pane. For example, the transparent substrate 10 may include an indium tin oxide (ITO) substrate, an ITO substrate on which a coloring material (e.g., NiO, $Cr_2O_3$, CoO, etc.) is deposited, a polymer film such as polyester, polysulfone, polycarbonate, polyamide, polystyrene, polymethylpentane, polyethyleneterephthalate, or polyvinylchloride, or a substrate including a polymer film on which a coloring material is deposited. Also, the transparent substrate 10 may be surface-treated in order to easily coat a thermochromic layer thereon.

The dielectric layers 21, 22, 23, in one embodiment, are respectively interposed between the glass substrate 10 and a thermochromic layer 31 (e.g., a vanadium oxide layer) or between thermochromic layers 31, 32 (e.g., vanadium oxide layers) to solve problems that occur due to disorder of lattices of the vanadium oxide layers. In addition, the dielectric layers increase durability of the panel. According to an embodiment of the present invention, to form a vanadium oxide layer on the transparent substrate, a buffer layer is formed of a dielectric layer 21 on the transparent substrate 10, and a vanadium oxide layer is formed on the buffer layer, thereby easily performing crystallization of vanadium oxide.

The dielectric layers 21, 22, 23 may be formed using one or more of various methods. Examples of methods of forming the dielectric layers 21, 22, 23 include chemical vapor deposition (CVD), sputtering, and coating.

In the thermochromic layer, metal insulator transition (MIT) occurs at a predetermined temperature. That is, if an ambient temperature is higher than a phase change temperature of the thermochromic layer, the thermochromic layer blocks or reflects infrared rays. If the ambient temperature is lower than the thermochromic layer, the thermochromic layer transmits infrared rays.

The thermochromic layers 31, 32 may be formed of vanadium oxide (VxOy), or may be formed of any material whose infrared ray transmittance has the greatest variation around a transition temperature. The thermochromic layers 31, 32 may be formed using one or more of various methods. Examples of methods of forming the thermochromic layers 31, 32 include chemical vapor deposition (CVD), sputtering, and coating.

Referring to FIG. 1A, the panel including a thermochromic layer according to one embodiment of the present invention includes a transparent substrate (e.g., glass substrate) 10, a first dielectric layer 21 formed on the transparent substrate 10, a first thermochromic (e.g., vanadium oxide) layer 31 formed on the first dielectric layer 21, a second dielectric layer 22 formed on the first thermochromic layer 31, a second thermochromic (e.g., vanadium oxide) layer 32 formed on the second dielectric layer 22, and a third dielectric layer 23 formed on the second thermochromic layer 32.

The panel including a thermochromic layer illustrated in FIG. 1B according to another embodiment of the present invention further includes a second transparent substrate 10' (e.g., a glass substrate) that is stacked on the third dielectric layer 23 illustrated in FIG. 1A. The second transparent substrate 10' may be formed of a same or different material from the transparent substrate 10.

Each of first dielectric layer 21, the second dielectric layer 22, and the third dielectric layer 23 may include at least one of the group consisting of tantalum oxide ($Ta_2O_5$), zinc oxide (ZnO), tin oxide ($SnO_2$), niobium oxide ($Nb_2O_5$), titanium oxide (TiO), and titanium dioxide ($TiO_2$). Alternatively, each of the first dielectric layer 21, the second dielectric layer 22, and the third dielectric layer 23 may include silicon oxynitride (SiON), silicon oxy carbide (SiOC), or silicon dioxide ($SiO_2$).

The first dielectric layer 21, the second dielectric layer 22, and the third dielectric layer 23 may be formed of the same material or different materials. Also, each of the first dielectric layer 21, the second dielectric layer 22, and the third dielectric layer 23 may be formed of a plurality of oxides.

Titanium oxide is a type of photo catalyst which has good durability and resistance to abrasion. Thus, when the dielectric layers are formed of titanium oxide, the dielectric layers may be cost-effective and stable. Also, if a multi-layer structure of dielectric layers is manufactured according to an optical design, titanium oxide performs an anti-reflection function, thereby increasing light transmittance.

The thickness of each of the first through third dielectric layers 21, 22, and 23 may be several to several hundreds of nm. However, the thicknesses of the first through third dielectric layers 21, 22, and 23 are not limited thereto, and may be controlled according to necessity.

The first and second thermochromic layers 31 and 32 may be formed of a vanadium dioxide (VxOy) including vanadium and oxygen in a stoichiometric ratio of 1:2, a vanadium oxide (VOx, x<2), or a vanadium pentoxide (VxOy) (x:y=2:5). Vanadium oxide (VOx) (x<2) is included because it exists as vanadium dioxide in an environment where vanadium oxide exists uniformly but a phase thereof is less oxidized in an environment where vanadium oxide exists less uniformly and because according to circumstances, vanadium atoms may exist in a metal state in the vanadium oxide.

The first and second thermochromic layers 31 and 32 may be formed of the same material or different materials. Also, each of the first and second thermochromic layers 31 and 32 may contain various vanadium oxides.

In particular, vanadium dioxide ($VO_2$) is known to have a phase change temperature of about 68° C. That is, at a temperature higher than 68° C., vanadium dioxide ($VO_2$) exists in a metal state and blocks or reflects infrared rays. At a temperature lower than 68° C., vanadium dioxide ($VO_2$) exists in a semiconductor state and transmits infrared rays.

Each of the first and second thermochromic layers 31 and 32 may have a thickness of about 20 nm to about 500 nm. If the thickness of each of the first and second vanadium oxide layers 31 and 32 is less than 20 nm, transmittance of infrared rays is increased but it is difficult to obtain the thermochromic effect by each of the first and second thermochromic layers 31 and 32 when they are too thin. Also, if each of the thickness of the first and second thermochromic layers 31 and 32 is greater than 500 nm, transmittance of infrared rays is decreased regardless of the thermochromic effect, and it is difficult to crystallize the first and second thermochromic layers 31 and 32 when forming the first and second vanadium oxide layers 31 and 32 on a transparent substrate.

According to an embodiment of a panel of the present invention, a plurality of dielectric layers are stacked between a plurality of vanadium oxide layers on a transparent substrate (e.g. a glass substrate). In one embodiment, because the vanadium oxide has different crystalline characteristics from glass, just by forming a vanadium oxide layer of a small thickness of several to several hundreds of nm on a glass, it is difficult to obtain a crystalline state of the vanadium oxide layer for obtaining the thermochromic effect. On the other hand, if the thickness of the vanadium oxide layer is too large, the transmittance is decreased to 5% or less, and thus the panel has little practical use.

Accordingly, the panel including a thermochromic layer according to the current embodiment of the present invention includes the first through third dielectric layers 21, 22, and 23 to thereby maintain the crystalline structure of the first and second thermochromic (e.g., vanadium oxide) layers 31 and 32 and increase durability of the panel. In detail, the first dielectric layer 21 is disposed between the transparent substrate 10 and the first thermochromic layer 31 and the second dielectric layer 22 is disposed between the first and second thermochromic layers 31 and 32 so as to function as buffer layers, thereby facilitating crystallization of the first and second thermochromic layers 31 and 32 when forming the first and second thermochromic layers 31 and 32. Also, the third dielectric layer 23 is an outermost layer and protects the first and second thermochromic layers 31 and 32 from harmful external environmental substances, thereby functioning as an anti-reflection layer and increasing the light transmittance of the panel. In the embodiment of FIG. 1B, the second transparent substrate 10' (e.g., a glass substrate) is on the third dielectric layer 23.

Figure 2:
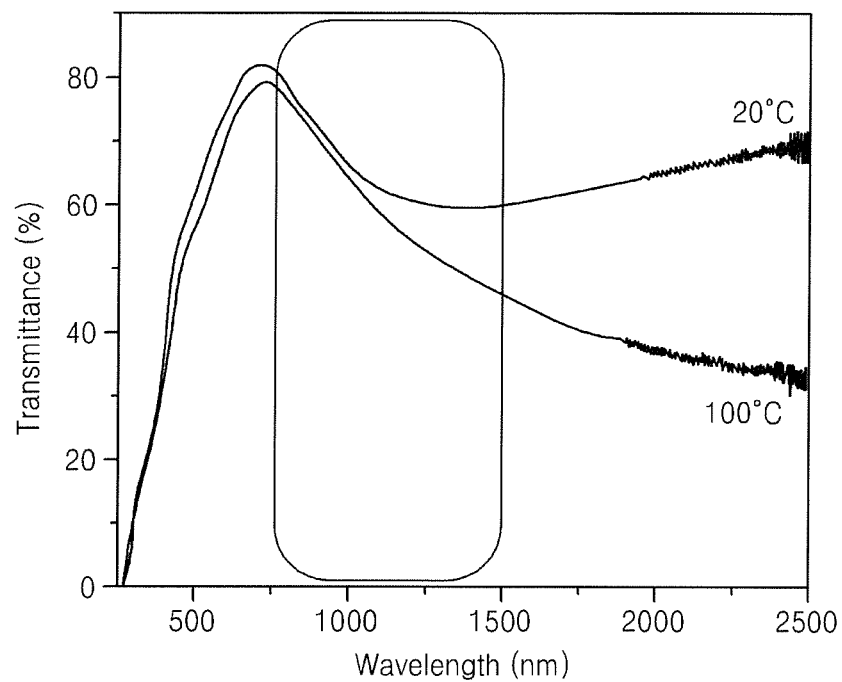
FIG. 2 is a graph showing the light transmittance of a panel in which a first dielectric layer, a vanadium oxide layer, and a second dielectric layer are sequentially stacked on a glass substrate, according to an embodiment of the present invention.

FIG. 2 is a graph showing the light transmittance of a glass in which a first dielectric layer, a vanadium oxide layer, and a second dielectric layer are sequentially stacked on a glass substrate, according to an embodiment of the present invention.

Figure 3:
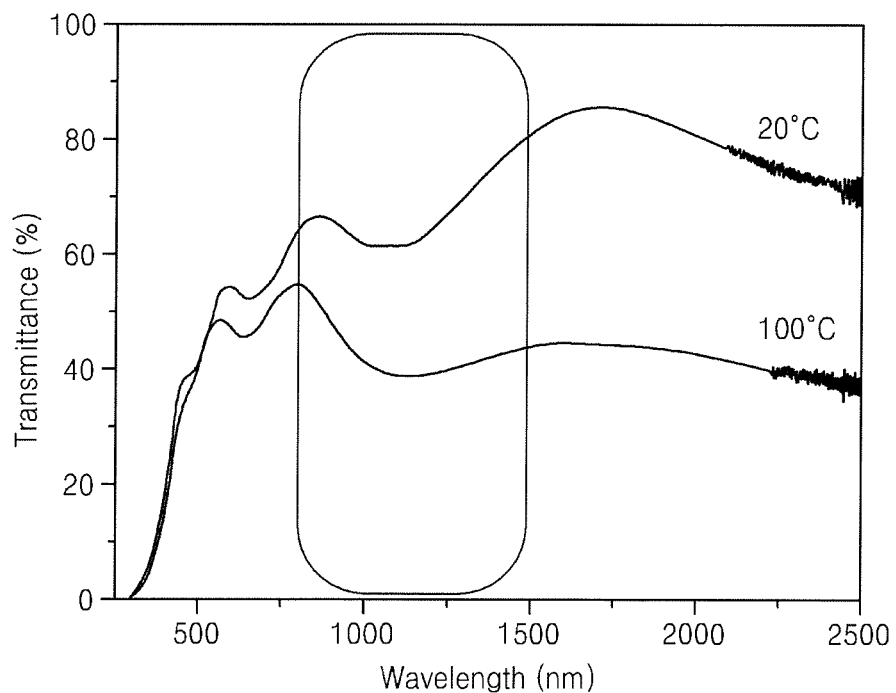
FIG. 3 is a graph showing the light transmittance of a panel in which a first dielectric layer, a first vanadium oxide layer, a second dielectric layer, a second vanadium oxide layer, and a third dielectric layer are sequentially stacked on a glass substrate, according to an embodiment of the present invention.

FIG. 3 is a graph showing the light transmittance of a glass in which a first dielectric layer, a first vanadium oxide layer, a second dielectric layer, a second vanadium oxide layer, and a third dielectric layer are sequentially stacked on a glass substrate, according to an embodiment of the present invention.

Hereinafter, the effect of the glass including a thermochromic layer will be described with reference to FIGS. 2 and 3.

FIG. 2 shows the transmittance of infrared rays around a transition temperature when a first dielectric layer, a vanadium oxide layer, and a second dielectric layer are sequentially stacked on a glass substrate (hereinafter referred to as Case 1). In Case 1, the first dielectric layer and the second dielectric layer are formed of titanium oxide, and the vanadium oxide layer is formed of vanadium dioxide ($VO_2$), a transition temperature of which is about 68° C. Also, thicknesses of the first dielectric layer and the second dielectric layer are about 130 nm, and a thickness of the vanadium oxide layer is about 50 nm.

In Case 1, the glass has about 65% transmittance at a temperature below the transition temperature (20° C.) and 63.5% transmittance at a temperature above the transition temperature (100° C.) at a wavelength of 1000 nm, respectively. Accordingly, a difference in transmittance above and below the transition temperature is about 1.5%. At a wavelength of 1500 nm, the glass in Case 1 has about 60% of transmittance at a temperature below the transition temperature (20° C.) and about 40% of transmittance at a temperature above the transition temperature (100° C.). Accordingly, a difference in transmittance above and below the transition temperature is about 13%.

FIG. 3 shows the transmittance of infrared rays around a transition temperature when a first dielectric layer, a first vanadium oxide layer, a second dielectric layer, a second vanadium oxide layer, and a third dielectric layer are sequentially stacked on a glass substrate (hereinafter referred to as Case 2). In Case 2, the first through third dielectric layers are formed of titanium oxide, and the first and second vanadium oxide layers are formed of vanadium dioxide ($VO_2$), a transition temperature of which is about 68° C. Also, thicknesses of the first through third dielectric layers are about 130 nm, and thicknesses of the first and second vanadium oxide layers are about 50 nm.

At a wavelength of 1000 nm, the glass in Case 2 has about 62 transmittance at a temperature below the transition temperature (20° C.) and about 45% transmittance at a temperature above the transition temperature (100° C.). Accordingly, a difference in transmittance above and below the transition temperature is about 17%. At a wavelength of 1500 nm, the glass in Case 2 has about 80% transmittance at a temperature below the transition temperature (20° C.) and 48% transmittance at a temperature above the transition temperature (100° C.). Accordingly, a difference in transmittance above and below the transition temperature is about 32%.

The above results are shown in Table 1 below.

TABLE 1

|  | Difference in transmittance at wavelength below and above transition temperature | |
| --- | --- | --- |
|  | 1000 nm | 1500 nm |
| Case 1 | 1.5% | 13% |
| Case 2 | 17% | 32% |

In the solar radiation spectrum, light having a wavelength of 700 nm or higher is classified as infrared light. In detail, infrared radiation having a wavelength in the range of 780 nm to 1000 nm has a greater intensity than infrared radiation having a wavelength in the range of 1000 nm to 2500 nm. Accordingly, in order to efficiently use energy by controlling infrared radiation transmittance, it is efficient to control the transmittance of infrared rays at wavelengths of about 1000 nm.

Referring to Table 1, Case 2 shows a large difference in infrared ray transmittances above and below the transition temperature at a wavelength of about 1000 nm. That is, in Case 2, reflection and transmission of infrared rays above and below the transition temperature is more distinct than Case 1. If an ambient temperature is higher than the transition temperature, the thermochromic layer has the properties of a metal and blocks infrared rays on a surface of the thermochromic layer. In Case 2, more thermochromic layers are included than in Case 1, and thus the effect of blocking infrared rays is greater due to transition of the thermochromic layer into a metallic material. In other words, the efficiency of blocking infrared rays of Case 2 is better than that of Case 1 when the ambient temperature is higher than the transition temperature. Accordingly, when a window pane is manufactured using the glass of Case 2, above the transition temperature, transmission of infrared rays is better prevented.

Accordingly, the indoor temperature may be controlled and energy for heating and cooling may be saved.

Figure 4A:
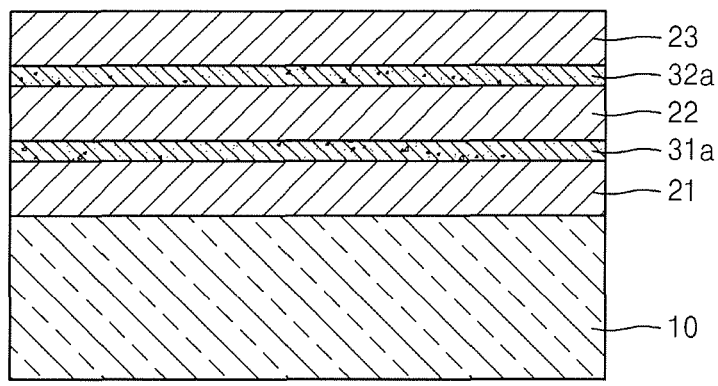
FIGS. 4A and 4B are cross-sectional views illustrating a panel including a thermochromic layer, according to another embodiment of the present invention.
Figure 4B:
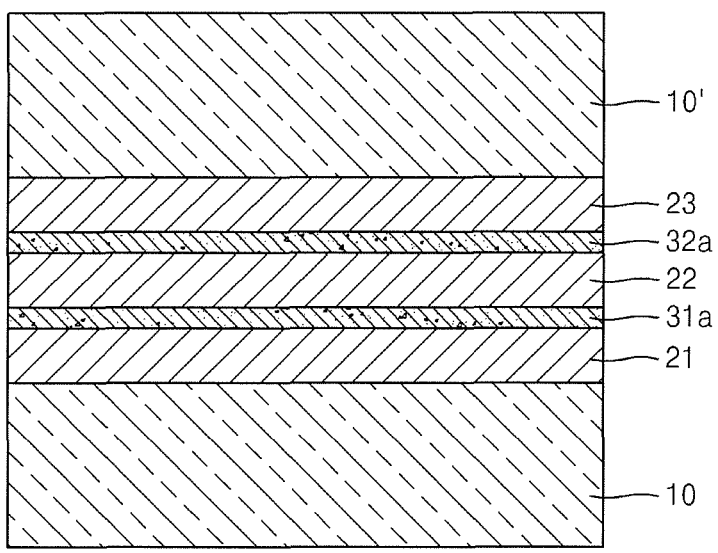

FIGS. 4A and 4B are cross-sectional views illustrating a panel including a thermochromic layer, according to another embodiment of the present invention.

Referring to FIG. 4A, the panel including a thermochromic layer according to the current embodiment has substantially the same structure as the panel illustrated in FIGS. 1A and 1B, in that the glass includes a transparent substrate (e.g. a glass substrate) 10, a first dielectric layer 21 formed on the transparent substrate 10, a first vanadium oxide layer 31a formed on the first dielectric layer 21, a second dielectric layer 22 formed on the first vanadium oxide layer 31a, a second vanadium oxide layer 32a formed on the second dielectric layer 22, and a third dielectric layer 23 formed on the second vanadium oxide layer 32a. However, the panel of FIG. 4 is different in that a particular element is included for shifting a transition temperature of the first vanadium oxide layer 31a and the second vanadium oxide layer 32a.

The panel including a thermochromic layer illustrated in FIG. 4B according to another embodiment of the present invention further includes a second transparent substrate (e.g., a glass substrate) 10' that is stacked on the third dielectric layer 23 illustrated in FIG. 4A.

Thus, elements (or components) of the panels of FIGS. 4A and 4B corresponding to the elements of the panels described with reference to FIGS. 1A and 1B have the same or similar functions, and thus description thereof will not be repeated.

According to one embodiment, one or more elements (or components) for shifting a transition temperature of the first vanadium oxide layer 31a and the second vanadium oxide layer 32a may be added to the first vanadium oxide layer 31a and the second vanadium oxide layer 32a. In one embodiment, the same element may be added to the first vanadium oxide layer 31a and the second vanadium oxide layer 32a in the same ratio or in different ratios. In another embodiment, different elements may be added to the first vanadium oxide layer 31a and the second vanadium oxide layer 32a in the same ratio or in different ratios.

The added element (or elements) may include at least one element selected from the group consisting of a halogen group including fluorine (F), and a metal group including titanium (Ti), niobium (Nb), molybdenum (Mo), iridium (Ir), and tungsten (W), but is not limited thereto, and the added element may be any material having a larger atom radius than an atom radius of vanadium (V). For example, a halogen may be included in one embodiment, and a metal may be included in another embodiment. Further, both the halogen and the metal may be included in yet another embodiment.

When at least one element selected from the group consisting of a halogen group including fluorine (F), and a metal group including titanium (Ti), niobium (Nb), molybdenum (Mo), iridium (Ir), and tungsten (W) is added to the first and second vanadium oxide layers 31a and 32a, the transition temperature of vanadium oxide may be adjusted. In particular, the transition temperature of vanadium oxide may be reduced to a room temperature for application in window panes.

The type and content of the added element are determined in relation to the variation in the transition temperature of vanadium oxide. This will be described with reference to FIG. 5 and Table 2 below.

Figure 5:
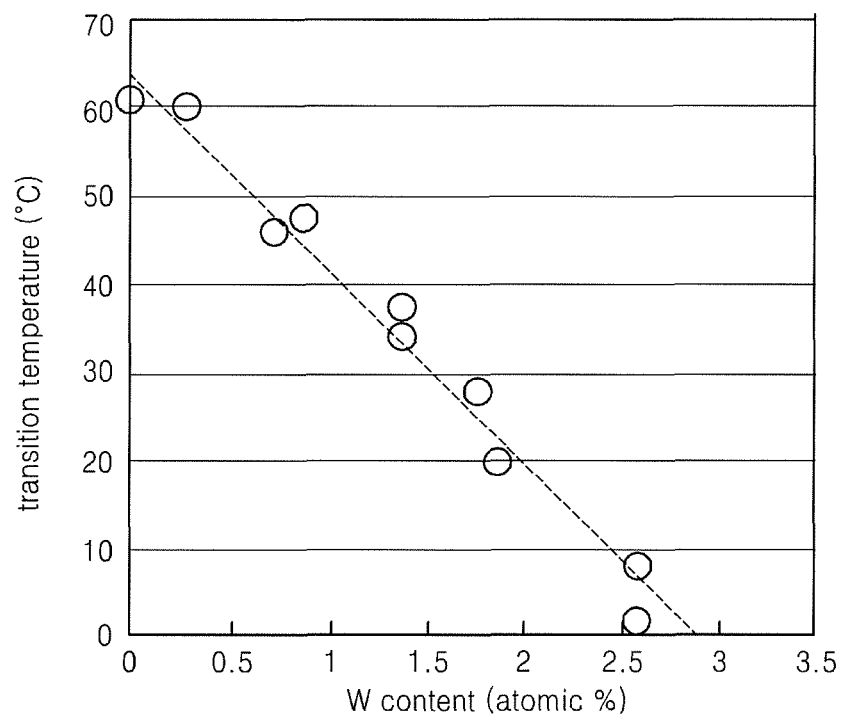
FIG. 5 is a graph showing a variation in the transition temperature of a vanadium dioxide layer with respect to a content of tungsten (W) contained in the vanadium dioxide layer.

FIG. 5 is a graph approximately showing the variation in the transition temperature of a vanadium dioxide layer with respect to the content of tungsten (W) contained in the vanadium dioxide layer ($VO_2$).

Table 2 shows values of the content of W and the transition temperature shown in FIG. 5.

TABLE 2

| Tungsten (W) content (at. %) | Transition temperature of vanadium dioxide layer containing W (° C.) |
|---|---|
| 0.00 | 60.71 |
| 0.30 | 60.06 |
| 0.73 | 45.88 |
| 0.88 | 47.35 |
| 1.39 | 33.82 |
| 1.78 | 27.65 |
| 1.88 | 19.50 |
| 2.59 | 7.65 |

A transition temperature of vanadium oxide included in a thermochromic layer is about 68° C., and the transition temperature of vanadium oxide is shifted to at most 50° C. or less in order to apply the thermochromic characteristics for practical use according to one embodiment. As shown in FIG. 5 and Table 2, when W is added to the vanadium dioxide ($VO_2$) layer, the transition temperature of the vanadium dioxide ($VO_2$) layer is lowered from about 68° C., for example, to about 20° C., when the content of W is about 1.88 at. % (i.e., atomic %).

By using the panel including the thermochromic layer according to the embodiment illustrated in FIG. 4A or FIG. 4B, the transition temperature of the first vanadium oxide layer 31a or the second vanadium oxide layer 32a may be adjusted by doping them with 1 at. % to 2.5 at. % of W. The remaining content of the first vanadium oxide layer 31a or the second vanadium oxide layer 32a includes vanadium atoms and oxygen atoms. According to one embodiment of the present invention, the first and second vanadium oxide layers 31a and 32a may have different transition temperatures. For example, by doping the first vanadium oxide layer 31a with 1.8 at. % to 2.5 at. % of W, the transition temperature of the first vanadium oxide layer 31a may be adjusted to about 20° C. Also, by doping the second vanadium oxide layer 32a with 1 at.% to 1.5 at. % of W, the transition temperature of the second vanadium oxide layer 32a may be adjusted to about 30° C.

When a panel (e.g., glass) including a thermochromic layer according to an embodiment of the present invention is used as a window pane, a transition temperature of the thermochromic layer may be fixed. However, a thermochromic layer having a low transition temperature is needed because a large amount of infrared rays needs to be received indoors in winter. Also, in summer, a thermochromic layer having a high transition temperature is needed because it is not desirable for infrared rays to enter indoors.

Accordingly, as described above, regarding the panel having the structure including a first dielectric layer, a first vanadium oxide layer, a second dielectric layer, a second vanadium oxide layer, and a third dielectric layer, when the first vanadium oxide layer and the second vanadium oxide layer have different transition temperatures, by setting a transition temperature of one vanadium oxide layer to be higher than the average temperature of a window pane in winter, and setting a transition temperature of the other vanadium oxide layer to be similar to the average temperature of a window pane in summer, a large amount of infrared rays may be received indoors in winter, and in summer, infrared rays may be reflected, thereby maintaining a uniform indoor temperature regardless of the outside temperature.

As described above, according to the one or more of the above embodiments of the present invention, the amount of infrared rays that enters buildings may be efficiently controlled by using a panel (e.g., a glass panel) including a thermochromic layer containing vanadium oxide. Accordingly, a substantially constant indoor temperature may be maintained, and energy needed in heating and cooling may be saved.

It should be understood that the exemplary embodiments described herein should be considered in a descriptive sense only and not for purposes of limitation. It should be understood that descriptions of features or aspects within each embodiment are to be considered as available or interchangeable with other similar features or aspects in other embodiments.

What is claimed is:

1. A panel comprising:
a transparent substrate;
a plurality of thermochromic layers on the transparent substrate; and
a plurality of dielectric layers stacked with the thermochromic layers,
wherein the panel transmits a first amount of light therethrough at a temperature less than a transition temperature of at least one thermochromic layer of the plurality of thermochromic layers, and the panel transmits a second amount of light therethrough at a temperature greater than the transition temperature of the at least one thermochromic layer, the first amount of light being greater than the second amount of light, and
wherein a dielectric layer of the plurality of dielectric layers is between the transparent substrate and a first thermochromic layer of the plurality of thermochromic layers that is adjacent the transparent substrate, and another dielectric layer of the plurality of dielectric layers is between the first thermochromic layer and a second thermochromic layer of the plurality of thermochromic layers.

2. The panel of claim 1, wherein the thermochromic layers comprise vanadium oxide.

3. The panel of claim 2, wherein a chemical stoichiometric ratio of vanadium to oxygen in the vanadium oxide is about 1:2 or about 2:5.

4. The panel of claim 2, wherein at least one of the thermochromic layers further comprises a halogen.

5. The panel of claim 4, wherein the halogen comprises fluorine (F).

6. The panel of claim 2, wherein at least one of the thermochromic layers further comprises a metal additive.

7. The panel of claim 6, wherein the metal additive is selected from the group consisting of titanium (Ti), niobium (Nb), molybdenum (Mo), iridium (Ir), tungsten (W), and combinations thereof.

8. The panel of claim 6, wherein the metal additive is a dopant.

9. The panel of claim 1, wherein a first one of the thermochromic layers includes a first amount of metal additive that is different from a second amount of metal additive included in a second one of the thermochromic layers.

10. The panel of claim 1, wherein a first one of the thermochromic layers includes a first type of metal additive that is different from a second type of metal additive included in a second one of the thermochromic layers.

11. The panel of claim 1, wherein the transparent substrate comprises a material selected from the group consisting of glass, indium tin oxide (ITO), polymer film, and combinations thereof.

12. The panel of claim 1, wherein at least one of the plurality of dielectric layers comprises a material selected from the group consisting of tantalum oxide ($Ta_2O_5$), zinc oxide (ZnO), tin oxide ($SnO_2$), niobium oxide ($Nb_2O_5$), titanium oxide (TiO), titanium dioxide ($TiO_2$), silicon oxynitride (SiON), silicon oxy carbide (SiOC), silicon dioxide ($SiO_2$), and combinations thereof.

13. The panel of claim 1, wherein a first one of the plurality of dielectric layers comprises a material different from that of a second one of the plurality of dielectric layers.

14. The panel of claim 1, wherein each of the thermochromic layers has a thickness between about 20 nm and about 500 nm.

15. A panel comprising:
a transparent substrate;
a first dielectric layer on the transparent substrate;
a first vanadium oxide layer on the first dielectric layer;
a second dielectric layer on the first vanadium oxide layer;
a second vanadium oxide layer on the second dielectric layer; and
a third dielectric layer on the second vanadium oxide layer,
wherein the panel transmits a first amount of light therethrough at a temperature less than a transition temperature of at least one of the first or second vanadium oxide layers, and the panel transmits a second amount of light therethrough at a temperature greater than the transition temperature of the at least one vanadium oxide layer, the first amount of light being greater than the second amount of light.

16. The panel of claim 15, further comprising another transparent substrate on the third dielectric layer.

17. The panel of claim 15, wherein a chemical stoichiometric ratio of vanadium to oxygen in each of the first and second vanadium oxide layers is about 1:2 or about 2:5.

18. The panel of claim 15, wherein the first vanadium oxide layer and the second vanadium oxide layer have different transition temperatures.

19. The panel of claim 15, wherein the first vanadium oxide layer includes a first amount of metal additive that is different from a second amount of metal additive included in the second vanadium oxide layer.

20. The panel of claim 15, wherein the first vanadium oxide layer includes a first type of metal additive that is different from a second type of metal additive included in the second vanadium oxide layer.

21. The panel of claim 15, wherein the first vanadium oxide layer contains about 1.8 at. % to about 2.5 at. % of W, and the second vanadium oxide layer contains about 1 at. % to about 1.5 at. % of W.

22. The panel of claim 15, wherein each of the first and second vanadium oxide layers has a thickness between about 20 nm and about 500 nm.

23. The panel of claim 15, wherein at least one of the first, second and third dielectric layers comprises $TiO_2$.

* * * * *